# 2,848,666

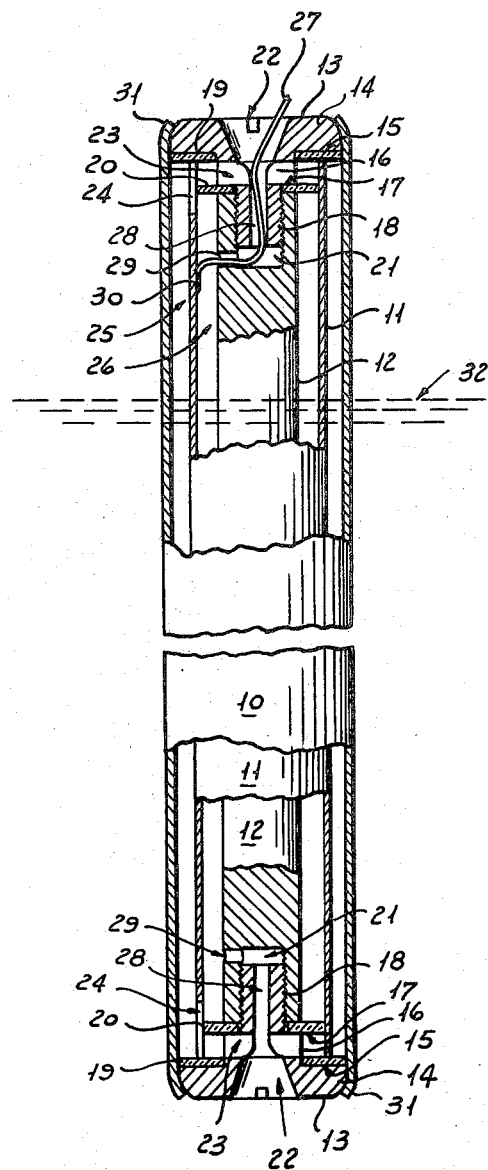

LIQUID LEVEL SENSING CAPACITOR

George V. Zito, Northvale, N. J., assignor to Bendix Aviation Corporation, Teterboro, N. J., a corporation of Delaware Application April 29, 1955, Serial No. 504,717

1 Claim. (Cl. 317—246)

This invention relates to liquid level indicating systems, and especially to an immersion capacitor designed for use in such systems. In arrangements of this type a capacitor is immersed in vertical position in a body of liquid of varying depth, extending from the lower part of the container to a point above the highest liquid level; and variations in the capacity of said capacitor, due to changes in liquid level, are translated electrically into depth indications, or other indications based on liquid level. An object of the invention is to provide a novel capacitor having extremely fast and accurate response to liquid immersion.

Another object is to provide a capacitor that will sense the liquid level to within a very short distance of the bottom of a container in which it is immersed.

A further object is to provide a novel capacitor arrangement that is completely radio frequency shielded.

An additional purpose is to provide a construction and arrangement of parts for such a capacitor that will be simple to construct and assemble without sacrificing efficieny. A related purpose is to provide such a construction comprising duplicate parts at opposite ends, connected by generally uniform condenser elements, so that condensers of different size and capacity can be produced by using the same end parts with connecting elements of different lengths.

Another object is to provide a capacitor of the indicated type arranged so that either end may be submerged.

The foregoing and other objects and advantages of the invention will appear more fully from consideration of the detailed description which follows, in conjunction with the accompanying drawing wherein one embodiment of the invention is illustrated. It is to be expressly understood, however, that the drawing is for the purposes of illustration and description and is not to be construed as defining the limits of the invention.

The single figure in the drawing illustrates an embodiment of the invention, shown mainly in longitudinal central section but with parts shown in perspective.

The illustrated condenser comprises an outer metal cylinder 10, an intermediate metal cylinder 11 and an inner metal cylindrical element 12, said cylinders and element being mutually spaced to form plates of a condenser. An arrangement is provided for holding said plates in fixed spaced relation, with the intermediate cylinder 11 insulated from the cylinder 10 and cylindrical element 12. As shown, identical constructions are provided at opposite ends, each including a circular metal cap 13 having a marginal flange 14 defining an outer shoulder 15 below which the cap is formed with a cylindrical body portion 16 ending in an inner shoulder 17, beyond which is a threaded integral stud 18.

Suitable annular insulating means engaging the cap 13 below flange 14 is provided for holding the intermediate cylinder 11 in position. In the form illustrated, an outer flat annular insulating washer 19, which may be made of mica or other suitable rigid insulation, fits against the outer shoulder 15 and the side of body 16, with an end of intermediate cylinder 11 bearing against the inner face of washer 19. An inner annular insulating washer 20 of similar material fits against inner shoulder 17, with its inner edge bearing against the stud 18 and its circular outer margin against the inner face of cylinder 11. In the embodiment shown, the inner cylindrical element 12 is in the form of a solid rod having a threaded axial bore 21 into which stud 18 is threaded, with the end of element 12 bearing against the inner face of inner washer 20 to hold it in position.

The described end structure of the condenser is provided with a suitable passage arrangement for the travel of fluid between the exterior of the condenser and the spaces between the condenser plates. In the form illustrated, the cap 13 is provided with a preferably conical axial orifice 22 communicating with a transverse passage 23 in the cap body 16 extending at both ends into the space inside of intermediate cylinder 11 between the washers 19 and 20. A longitudinal slot 24 in the end portion of cylinder 11 extends on both sides of the inner washer 20, providing communication between passage 23 and the space 25 between cylinders 10 and 11, as well as communication between the latter space and the inner space 26 between cylinder 11 and cylindrical element 12.

An arrangement is provided for connecting an electrical lead wire to the insulated intermediate cylinder 11. In the form illustrated, the lead wire 27 passes through orifice 22 and an axial bore 28 in stud 18 into the portion of the bore 21 below said stud, then through a radial bore 29 in rod 12 into the space 26, where a good conducting connection 30 with cylinder 11 is formed, as by soldering.

It will be evident that the construction described is particularly adapted for efficient manufacture by standard processes from standard parts, including rods and tubing, which can be cut to any desired length to provide condensers having different capacities, all of which will utilize the same caps 13 and washers 19 and 20. The parts are also planned for easy, rapid and efficient assembly. The caps 13 at opposite ends hold the central rod 12 and cylinder 11 firmly in place, the inner washer 20 providing uniform spacing between said rod and cylinder, after which the outer cylinder 10 may be put in place and the assembly held firmly together by spinning the margins 31 of cylinder 10 over the inwardly curved outer edges of the cap flanges 14.

When in use, the capacitor is placed in a vertical position in a liquid container, and is proportioned and located so that the maximum liquid level, indicated diagrammatically at 32, will be below the top of the condenser, the location indicated being illustrative and in no sense restrictive. When the condenser is immersed in liquid in a container (not shown), the liquid is free to flow upwardly through the lower orifice 22, passage 23 and slot 24 to the spaces 25 and 26, and upwardly in said spaces until it reaches the level of the liquid in the container. As said liquid level rises and falls, the passage system just indicated assures the maintenance in spaces 25 and 26 of the same liquid level as that outside of the condenser. The upper slot 24, passage 23 and orifice 22 provide a vent or breather system for gas above the liquid level, which is free to flow in or out as the level varies. This assures continuous accuracy when the liquid level is rising or falling at a rapid rate.

The communicating system at the top just indicated likewise provides an inlet for liquid, which may be fed through the upper orifice 22, traveling downwardly through spaces 25 and 26 and out through the bottom orifice 22 into the container, where it will rise as long as liquid is introduced through upper orifice 22. Upon termination of the liquid feed, the liquid level inside and outside of the condenser will be immediately equalized.

Electrical systems which utilize this type of condenser to provide indications based on the variable liquid depth are known, one system of this type being shown in patent application Serial No. 401,916, Bechberger, filed January 4, 1954, now abandoned. Such systems are suitable for use in various fields, including liquid fuel supplies such as those used in aircraft, and liquefied gas supplies such as containers for liquid oxygen used in providing a gaseous oxygen supply to aviators, the form illustrated having been found to be particularly efficient in the latter field. The type of construction described has been found especially desirable, since it will withstand wide extremes of temperature, being accurate and effective at temperatures ranging from below that of liquid oxygen ($-183°$ C.) to well above $100°$ C.

The plate spacing and the venting arrangement have been found to produce rapid and accurate maintenance of the correct liquid level within the condenser; and the latter can be used to indicate even a very shallow depth of liquid in the bottom of the container, by properly designing the condenser ends. The condenser is effectively radio frequency shielded, the insulated intermediate cylinder 11 being completely enveloped by the inner element 12, the outer cylinder 10 and the end caps 13, which are connected as a unit to the electrical circuit, preferably on the grounded side, since this arrangement provides effective shielding. The unit as described may be held in place by any desired type of support, such as a clamping arrangement (not shown) which may be grounded, and the inner and outer condenser elements 12 and 10 may be connected to the indicating circuit by any desired type of external contact.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

A liquid level sensing capacitor, comprising an elongated inner metallic condenser element, a surrounding tubular metallic condenser element, and a cylindrical outer casing element, conductive shielding means in the form of a cap at each end of the casing for supporting the said elements axially in concentric spaced apart relation to form longitudinally disposed annular liquid passages along the axis of the capacitor, said cap sealed to and embraced by the outer casing, means associated with each of the said end supports for electrically insulating the condenser elements, an axial centrally disposed passage formed in the shielding support means and lateral connecting passages for circulating dielectric fluid from an outside source through the annular passages, and means extending through the axial passage for connecting the condenser elements to a source of electricity.

References Cited in the file of this patent

UNITED STATES PATENTS

| | | |
|---|---|---|
| 1,939,067 | Legg | Dec. 12, 1933 |
| 2,560,757 | Bowar | July 17, 1951 |
| 2,563,281 | Griffith | Aug. 7, 1951 |
| 2,593,807 | Stein | Apr. 22, 1952 |

FOREIGN PATENTS

| | | |
|---|---|---|
| 455,731 | Canada | Apr. 5, 1949 |